United States Patent
You et al.

(10) Patent No.: US 10,348,477 B2
(45) Date of Patent: *Jul. 9, 2019

(54) METHOD FOR TRANSMITTING UPLINK CHANNEL AND DEMODULATION REFERENCE SIGNAL BY MTC DEVICE

(71) Applicant: LG ELECTRONICS INC., Seoul (KR)

(72) Inventors: Hyangsun You, Seoul (KR); Yunjung Yi, Seoul (KR); Bonghoe Kim, Seoul (KR); Joonkui Ahn, Seoul (KR); Hanjun Park, Seoul (KR)

(73) Assignee: LG ELECTRONICS, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/520,410

(22) PCT Filed: Oct. 22, 2015

(86) PCT No.: PCT/KR2015/011198
§ 371 (c)(1),
(2) Date: Apr. 19, 2017

(87) PCT Pub. No.: WO2016/064218
PCT Pub. Date: Apr. 28, 2016

(65) Prior Publication Data
US 2017/0317808 A1 Nov. 2, 2017

Related U.S. Application Data

(60) Provisional application No. 62/067,993, filed on Oct. 24, 2014.

(51) Int. Cl.
*H04L 5/00* (2006.01)
*H04L 5/10* (2006.01)
*H04W 72/04* (2009.01)

(52) U.S. Cl.
CPC .............. *H04L 5/10* (2013.01); *H04L 5/0051* (2013.01); *H04L 5/0055* (2013.01);
(Continued)

(58) Field of Classification Search
CPC ............ H04L 5/0007; H04W 72/0446; H04W 72/0453
(Continued)

(56) References Cited

U.S. PATENT DOCUMENTS

2010/0278168 A1* 11/2010 Kwon .................. H04L 5/0007
370/344
2013/0017835 A1* 1/2013 Takahashi ............. H04W 72/04
455/450
(Continued)

FOREIGN PATENT DOCUMENTS

| EP | 2768264 | 8/2014 |
|---|---|---|
| KR | 10-2013-0107855 | 10/2013 |
| WO | 2013082784 | 6/2013 |

OTHER PUBLICATIONS

NEC, "Uplink Reference Signal Enhancement for Low Cost MTC," 3GPP TSG-RAN WG1 #78bis, R1-143935, Oct. 2014, 6 pages.
(Continued)

*Primary Examiner* — Kevin M Burd
(74) *Attorney, Agent, or Firm* — Lee, Hong, Degerman, Kang & Waimey

(57) ABSTRACT

A disclosure of the present specification provides a method for transmitting an uplink channel and a demodulation reference signal (DMRS) by a machine type communication (MTC) device. The method may comprise the steps of: determining a frequency resource area for transmitting an uplink channel so as to have a size equal to or smaller than the size of a physical resource block (PRB) including 12 subcarriers; generating a DMRS sequence for some sub-
(Continued)

carriers among the 12 subcarriers when the frequency resource area for transmitting the uplink channel is determined to have a size smaller than the size of the PRB including the 12 subcarriers; and transmitting the uplink channel and the DMRS on the some subcarriers in the PRB.

8 Claims, 18 Drawing Sheets

(52) U.S. Cl.
CPC ... *H04W 72/0446* (2013.01); *H04W 72/0453* (2013.01); *H04L 5/0007* (2013.01); *H04L 5/0094* (2013.01)

(58) Field of Classification Search
USPC .......................................... 375/259
See application file for complete search history.

(56) References Cited

U.S. PATENT DOCUMENTS

| | | | |
|---|---|---|---|
| 2013/0064169 A1* | 3/2013 | Song ................ | H04B 7/155 370/315 |
| 2013/0135984 A1* | 5/2013 | Choi ................ | H04W 72/04 370/209 |
| 2017/0272141 A1* | 9/2017 | Horiuchi ............ | H04W 52/325 |

OTHER PUBLICATIONS

PCT International Application No. PCT/KR2015/011198, Written Opinion of the International Searching Authority dated Mar. 25, 2016, 6 pages.

\* cited by examiner

- Prior Art -

- Prior Art -

- Prior Art -

- Prior Art -

- Prior Art -

METHOD FOR TRANSMITTING UPLINK CHANNEL AND DEMODULATION REFERENCE SIGNAL BY MTC DEVICE

CROSS-REFERENCE TO RELATED APPLICATIONS

This application is the National Stage filing under 35 U.S.C. 371 of International Application No. PCT/KR2015/011198, filed on Oct. 22, 2015, which claims the benefit of U.S. Provisional Application No. 62/067,993, filed on Oct. 24, 2014, the contents of which are all hereby incorporated by reference herein in its entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

As one of methods of lowering cost per unit of MTC device, the MTC device may only use a limited region, i.e. only a subband, regardless of a system bandwidth of a cell.

Furthermore, when the amount of traffic transmitted by the MTC device is small, the MTC device may preferably transmit uplink data, for example, by using only a frequency domain resource (for example, several subcarriers) having a size of one physical resource block (PRB) or less.

However, as the related art, there is a method that allows the size of an uplink resource which a base station allocates to the MTC device to be one PRB size or less.

Further, in the related art, there is no method that allows a demodulation reference signal (DMRS) transmitted together with the uplink channel to be also one PRB size or less in order to demodulate the uplink channel.

SUMMARY OF THE INVENTION

Accordingly, the disclosure of the specification has been made in an effort to solve the problem.

In an aspect, provided is a method for transmitting an uplink channel and a demodulation reference signal (DMRS) by a machine type communication (MTC) device. The method may include: determining a frequency resource area for transmitting an uplink channel so as to have a size equal to or smaller than the size of a physical resource block (PRB) including 12 subcarriers; generating a DMRS sequence for some sub-carriers among the 12 subcarriers when the frequency resource area for transmitting the uplink channel is determined to have a size smaller than the size of the PRB including the 12 subcarriers; and transmitting the uplink channel and the DMRS on the some subcarriers in the PRB.

The generating of the sequence for the DMRS may include generating a DMRS sequence having a length of 12, mapping the DMRS having the length of 12 to 12 subcarriers, and puncturing the DMRS sequence mapped onto the residual subcarriers other than the some subcarriers.

The generating of the sequence for the DMRS may include generating the DMRS sequence having the length of 12, and mapping the DMRS sequences among the DMRS sequences having the length of 12, which are as large as the number of the some subcarriers to the some subcarriers.

The method may further include receiving downlink control information (DCI) including a resource allocation field for the uplink channel. The determining the frequency resource area for transmitting the uplink channel may be performed based on the DCI.

When the resource allocation field in the DCI indicates the frequency resource area for transmitting the uplink channel as a specific PRB, the DCI may further include a field indicating the some subcarriers in the specific PRB.

The resource allocation field in the DCI may indicate the some subcarriers.

The DCI may further include a frequency hopping flag field. When the resource allocation field in the DCI indicates the frequency resource area for transmitting the uplink channel as the specific PRB, the hopping flag field in the DCI may indicate the some subcarriers.

The determining of the frequency resource area for transmitting the uplink channel may include determining the same subcarriers in the PRB based on an ID of the MTC device.

The method may further include selecting the DMRS sequence based on a smallest index among indexes for the some subcarriers among a plurality of DMRS sequences.

In another aspect, provided is also a machine type communication (MTC) device for transmitting an uplink channel and a demodulation reference signal (DMRS). The MTC device may include the RF unit; and a processor controlling the RF unit. Herein, the processor may perform determining a frequency resource area for transmitting an uplink channel so as to have a size equal to or smaller than the size of a physical resource block (PRB) including 12 subcarriers, generating a DMRS sequence for some sub-carriers among the 12 subcarriers when the frequency resource area for transmitting the uplink channel is determined to have a size smaller than the size of the PRB including the 12 subcarriers, and transmitting the uplink channel and the DMRS on the some subcarriers in the PRB.

According to the disclosure of the present specification, the problems of the above-described prior art are solved.

DESCRIPTION OF EXEMPLARY EMBODIMENTS

Figure 1:
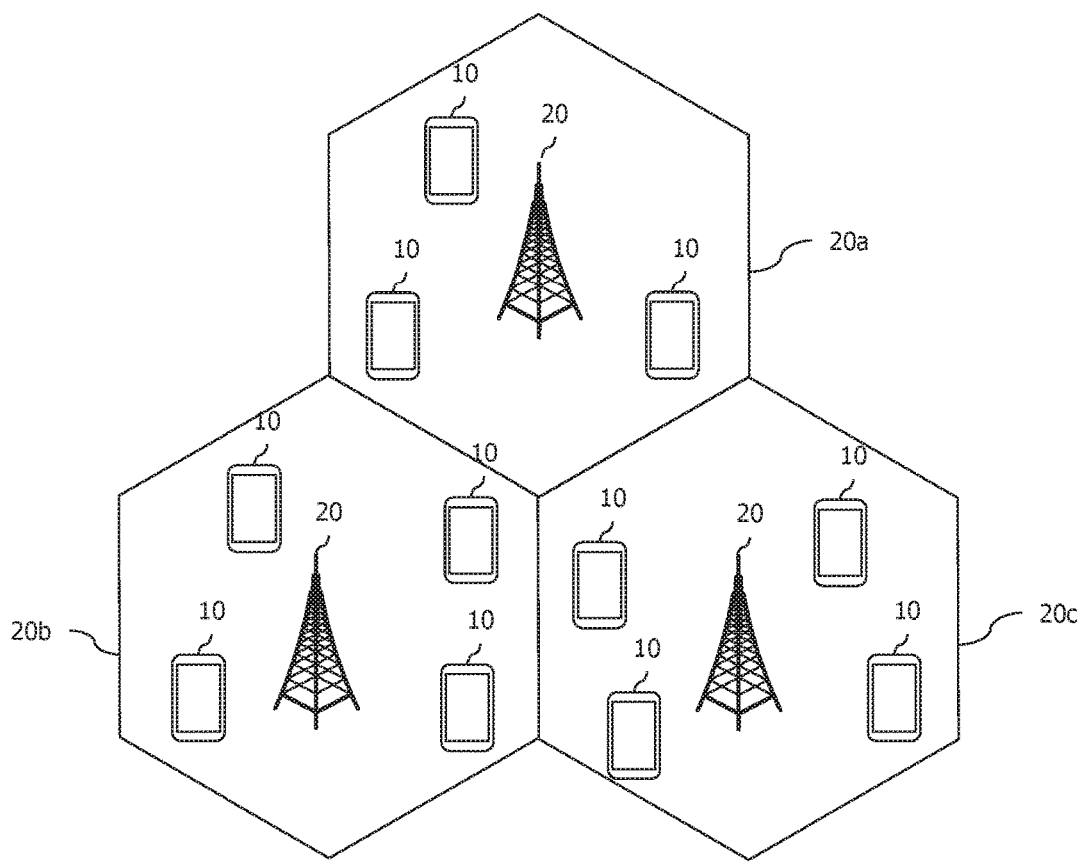
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
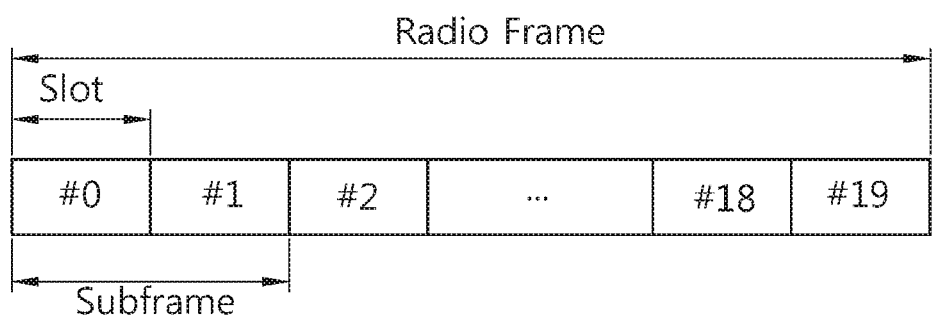
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
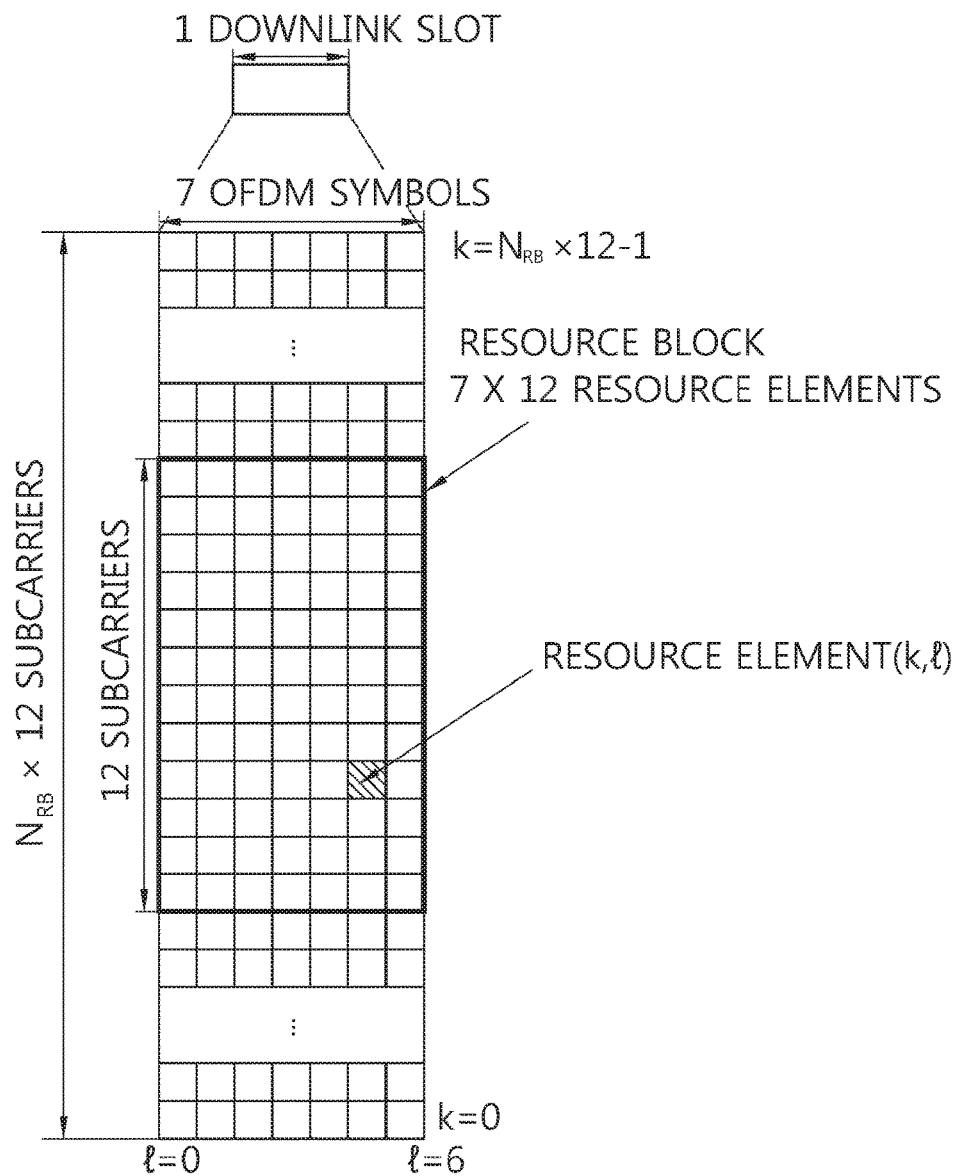
FIG. 3 illustrates the architecture of a downlink radio frame according to time division duplex (TDD) in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
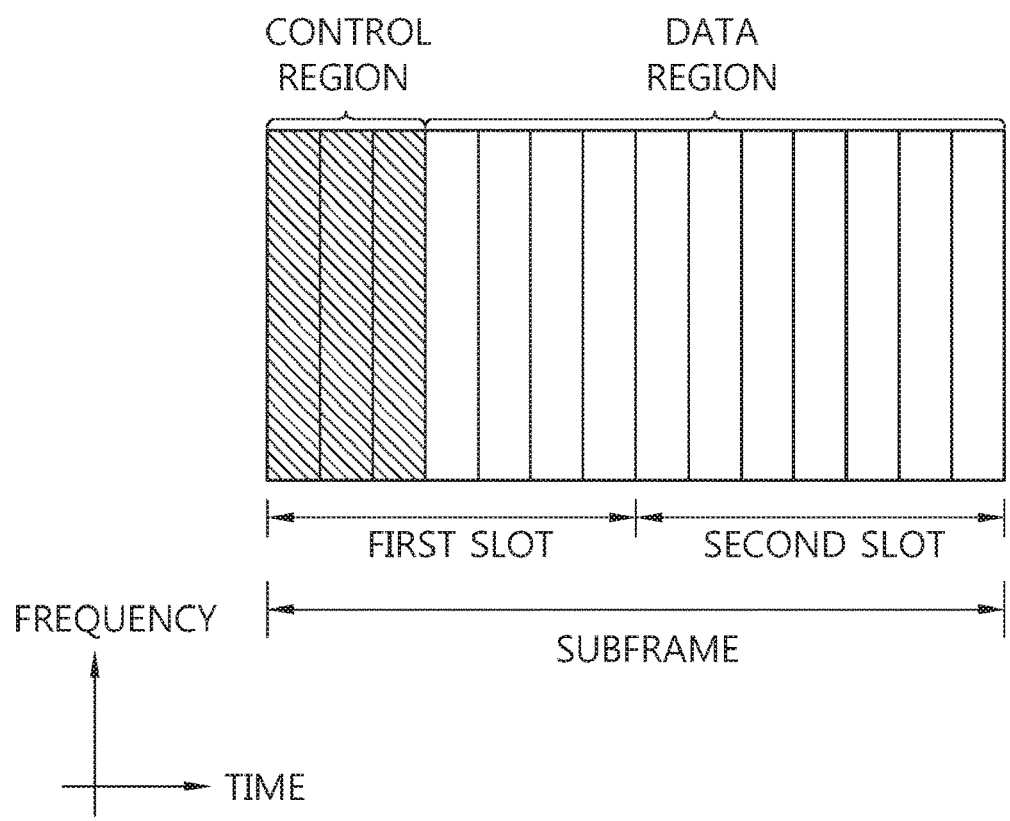
FIG. 4 illustrates an example resource grid for one uplink or downlink slot in 3GPP LTE.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
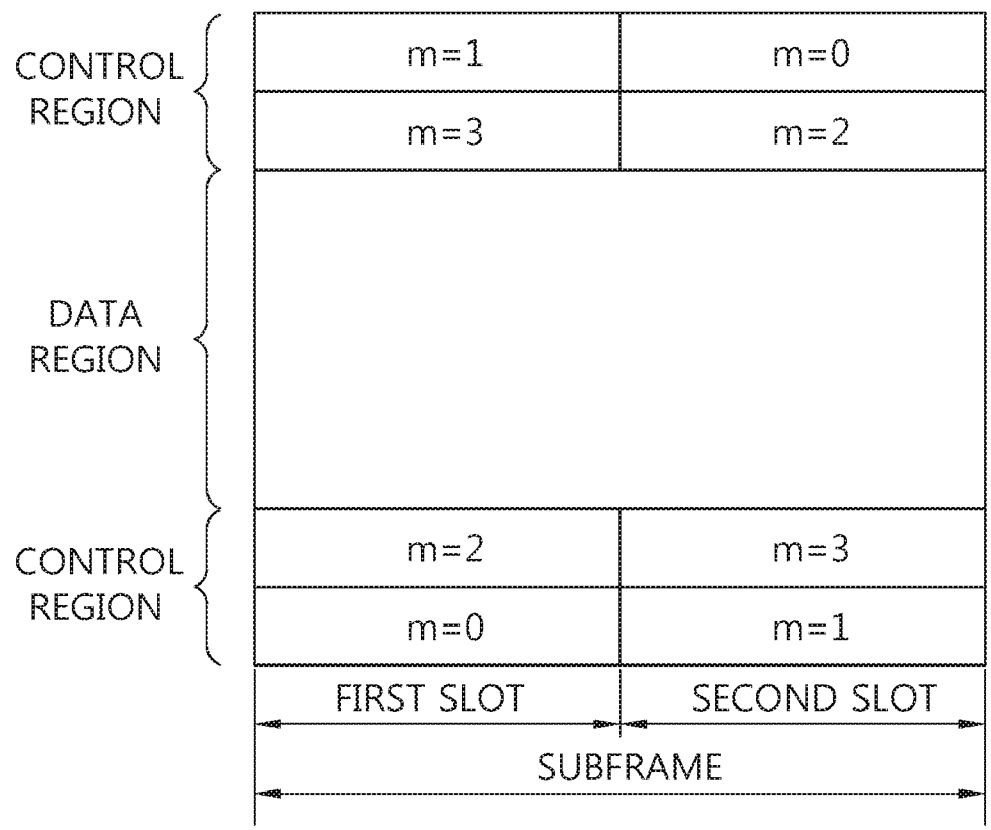
FIG. 5 illustrates the architecture of a downlink subframe.
Figure 5:
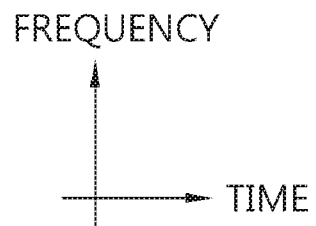

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
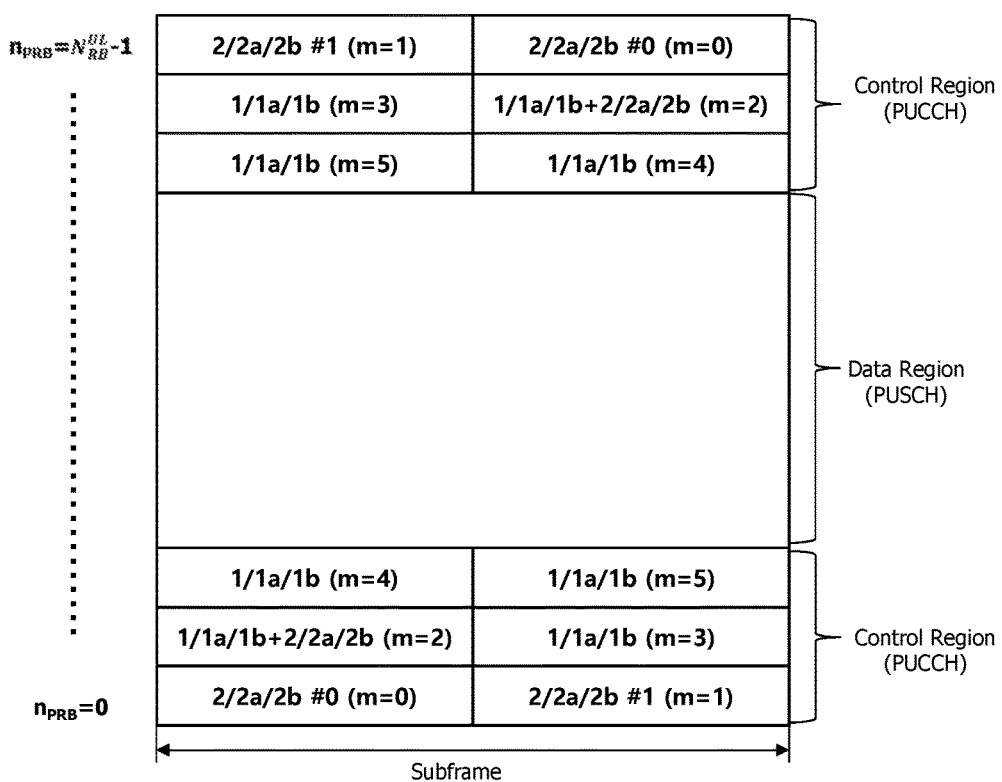
FIG. 6 is an exemplary diagram illustrating a transmission region based on the PUCCH formation.

FIG. 6 illustrates the PUCCH and the PUSCH on an uplink subframe.

PUCCH formats will be described with reference to FIG. 6.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 1

| Format | Modulation mode | Total bit count per subframe | Description |
|---|---|---|---|
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number (N(2)RB) of resource blocks which may be used in the PUCCH format 2/2a/2b in which the CQI is transmitted may be indicated to the UE through a broadcasted signal.

Figure 7A:
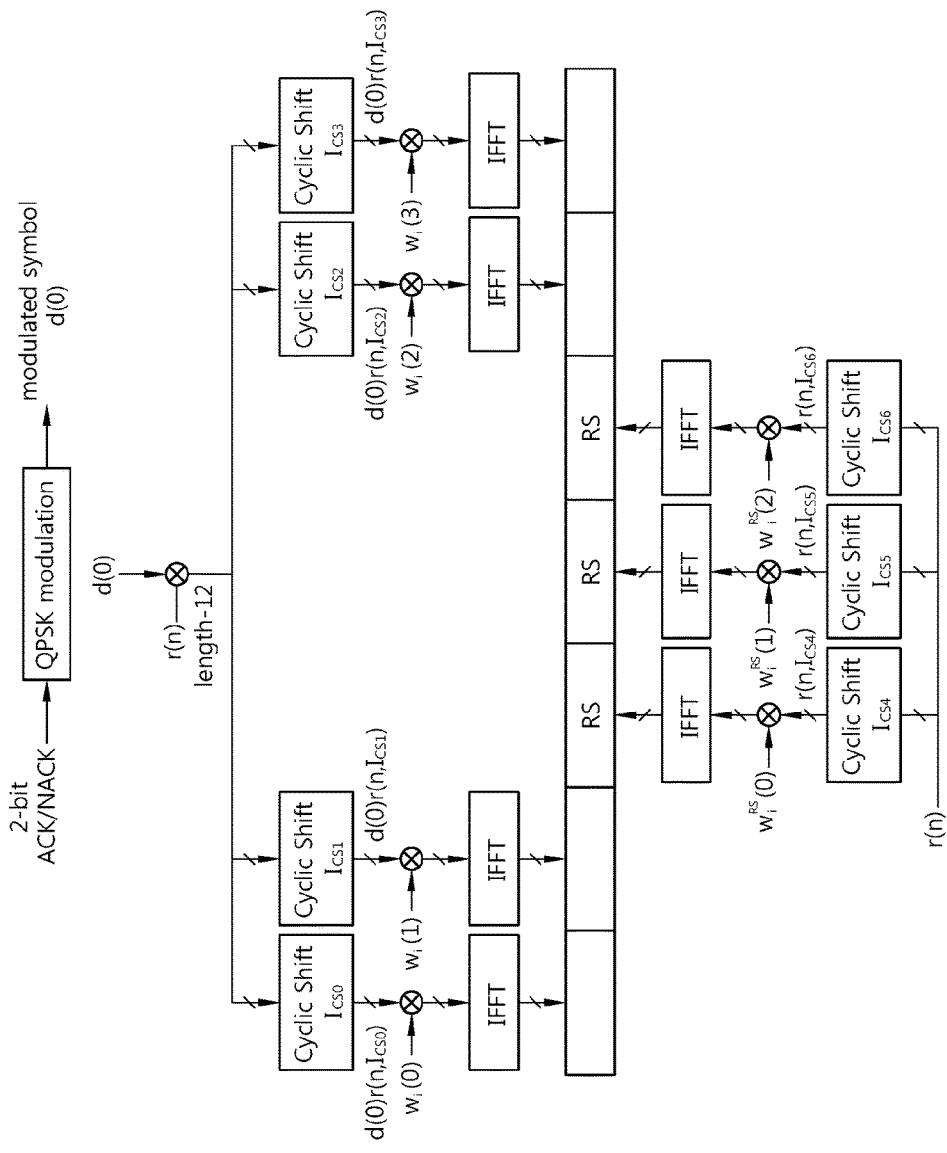
FIG. 7a illustrates a channel structure of PUCCH format 1b in a normal CP.

FIG. 7a illustrates a channel structure of PUCCH format 1b in a normal CP.

One slot includes 7 OFDM symbols, 3 OFDM symbols become OFDM symbol for a reference signal for demodulation, that is, a demodulation reference signal (DMRS), and 4 OFDM symbols become a data OFDM symbol for an ACK/NACK signal.

In the PUCCH format 1b, an encoded 2-bit ACK/NACK signal is quadrature phase shift keying (QPSK)-modulated to generate modulation symbol d(0).

A cyclic shift index $I_{cs}$ may vary depending on a slot number $n_s$ and/or a slot symbol index 1 in the radio frame.

In a normal CP, since 4 data OFDM symbols exist in one slot in order to transmit the ACK/NACK signal, cyclic shift indexes corresponding to respective data OFDM symbols are set as $I_{cs0}$, $I_{cs1}$, $I_{cs2}$, and $I_{cs3}$.

The modulation symbol d(0) is spread to a cyclic shifted sequence $r(n,I_{cs})$. When a 1D spread sequence corresponding to an (i+1)-th OFDM symbol in the slot is m(i), the 1D spread sequence may be expressed as {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}.

In order to increase a UE capacity, the 1D spread sequence may be spread by using an orthogonal sequence. The following sequence is used as an orthogonal $w_i(k)$ (i represents a sequence index, 0≤k≤K−1) in which a spreading factor K is 4.

TABLE 2

| Index (i) | K = 4 [ $w_i(0)$, $w_i(1)$, $w_i(2)$, $w_i(3)$ ] | K= 3 [ $w_i(0)$, $w_i(1)$, $w_i(2)$ ] |
|---|---|---|
| 0 | [ +1, +1, +1, +1 ] | [ +1, +1, +1 ] |
| 1 | [ +1, −1, +1, −1 ] | [ +1, $e^{j2\pi/3}$, $e^{j4\pi/3}$ ] |
| 2 | [ +1, −1, −1, +1 ] | [ +1, $e^{j4\pi/3}$, $e^{j2\pi/3}$ ] |

Different spreading factors may be used for each slot.

Therefore, when a predetermined orthogonal sequence index i is given, 2D spread sequences {s(0), s(1), s(2), s(3)} may be expressed as follows.

$$\{s(0),s(1),s(2),s(3)\}=\{w_i(0)m(0),w_i(1)m(1),w_i(2)m(2),w_i(3)m(3)\}$$

The 2D spread sequences {s(0), s(1), s(2), s(3)} are transmitted in corresponding OFDM symbols after inverse fast Fourier transform (IFFT) is performed. As a result, the ACK/NACK signal is transmitted onto the PUCCH.

The reference signal of the PUCCH format 1b is transmitted by cyclic-shifting a base sequence r(n) and thereafter, spreading the cyclic-shifted sequence r(n) to the orthogonal sequence. When cyclic shift indexes corresponding to 3 RS OFDM symbols are $I_{cs4}$, $I_{cs5}$, and $I_{cs6}$, 3 cyclic-shifted sequences $r(n,L_{cs4})$, $r(n,I_{cs5})$, and $r(n,I_{cs6})$ may be acquired. 3 cyclic-shifted sequences are spread to an orthogonal sequence $w^{RS}_i(k)$ in which K=3.

An orthogonal sequence index i, a cyclic shift index $I_{cs}$, and a resource block index m are parameters required for configuring the PUCCH and resources used to distinguish the PUCCH (alternatively, UE). When the number of available cyclic shifts is 12 and the number of available orthogonal sequence indexes is 3, the PUCCHs for a total of 36 UEs may be multiplexed to one resource block.

In the 3GPP LTE, a resource index $n^{(1)}_{PUCCH}$ is defined in order for the UE to acquire 3 parameters for configuring the PUCCH. The resource index is defined as $n^{(1)}_{PUCCH}=n_{CCE}+N^{(1)}_{PUCCH}$, and $n_{CCE}$ represents a number of a first CCE used for transmitting a corresponding PDCCH (that is, a PDCCH including downlink resource allocation (DCI) to schedule downlink data corresponding to the ACK/NACK signal) and $N^{(1)}_{PUCCH}$ represents a parameter which the base station announces to the UE as a higher layer message.

Time, frequency, and code resources used for transmitting the ACK/NACK signal are referred to as an ACK/NACK resource or a PUCCH resource. As described above, an index (an ACK/NACK resource index or a PUCCH index) of the ACK/NACK resource required to transmit the ACK/NACK signal onto the PUCCH may be expressed as at least any one of the orthogonal sequence index i, the cyclic shift index $I_{cs}$, the resource block index m, and an index for acquiring the three indexes. The ACK/NACK resource may include at least any one of the orthogonal sequence, the cyclic shift, the resource block, and a combination thereof.

Figure 7B:
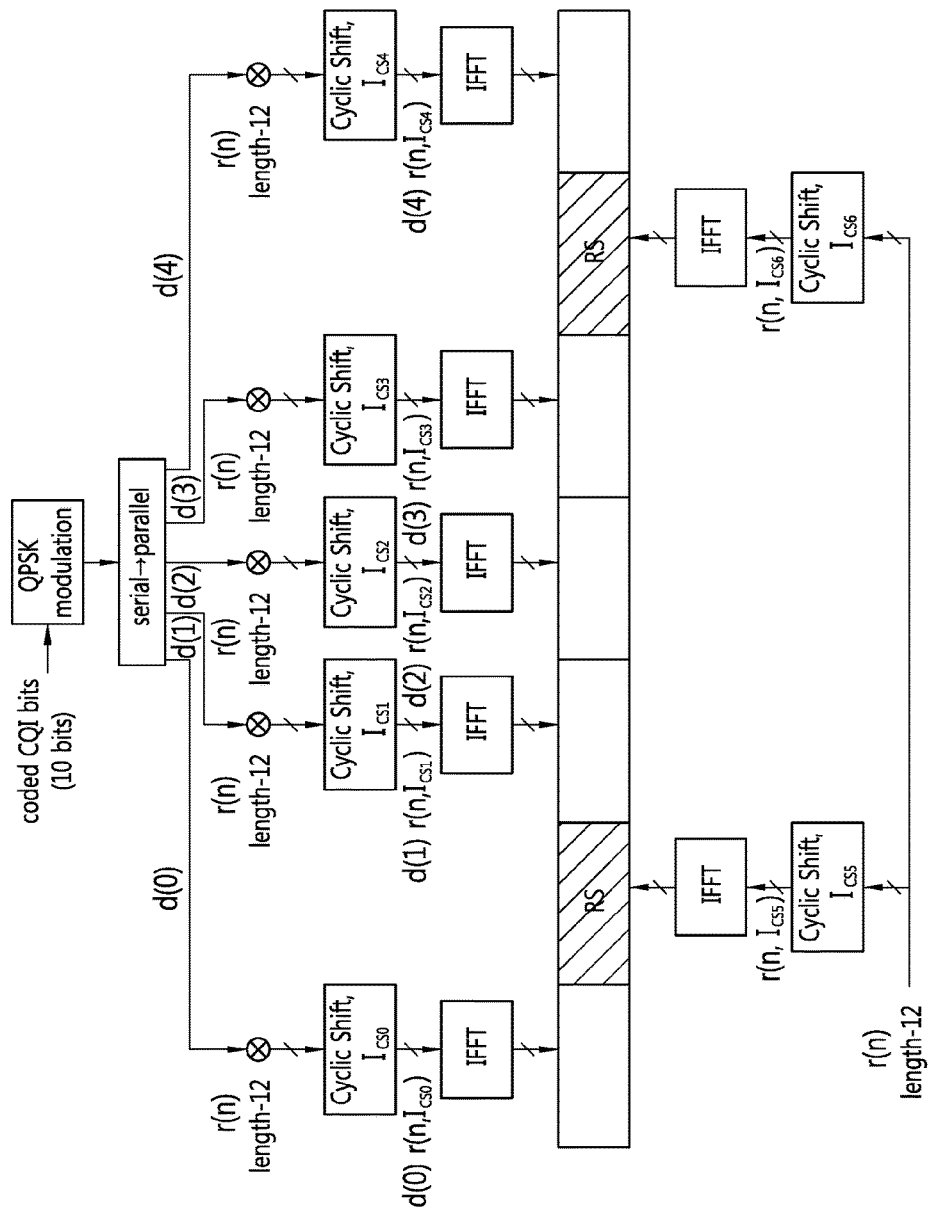
FIG. 7b illustrates a channel structure of PUCCH format 2/2a/2b in the normal CP.

FIG. 7b illustrates a channel structure of PUCCH format 2/2a/2b in the normal CP.

Referring to FIG. 7b, OFDM symbols 1 and 5 (that is, second and sixth OFDM symbols) are used for the reference signal (DMRS) for demodulation and residual OFDM symbols are used for CQI transmission in the normal CP. In an extended CP, OFDM symbol 3 (a fourth symbol) is used for the DMRS.

10 CQI bits are channel-coded at, for example, ½ code rate to become 20 coded bits. A Reed-Muller code may be used in the channel coding. In addition, the Reed-Muller code is scrambled and thereafter, constellation-mapped, and as a result, a QPSK modulation symbol is generated (d(0) to d(4) in slot 0). Each QPSK modulation symbol is modulated by cyclic shift of the basic RS sequence r(n) having a length of 12 and subjected to the IFFT to be transmitted in 10 respective SC-FDMA symbols in the subframe. 12 cyclic shifts which are spaced apart from each other allow 12 different UEs to be orthogonally multiplexed in the same PUCCH resource block. The basic RS sequence r(n) may be used as RS sequences applied to OFDM symbols 1 and 5.

Figure 7C:
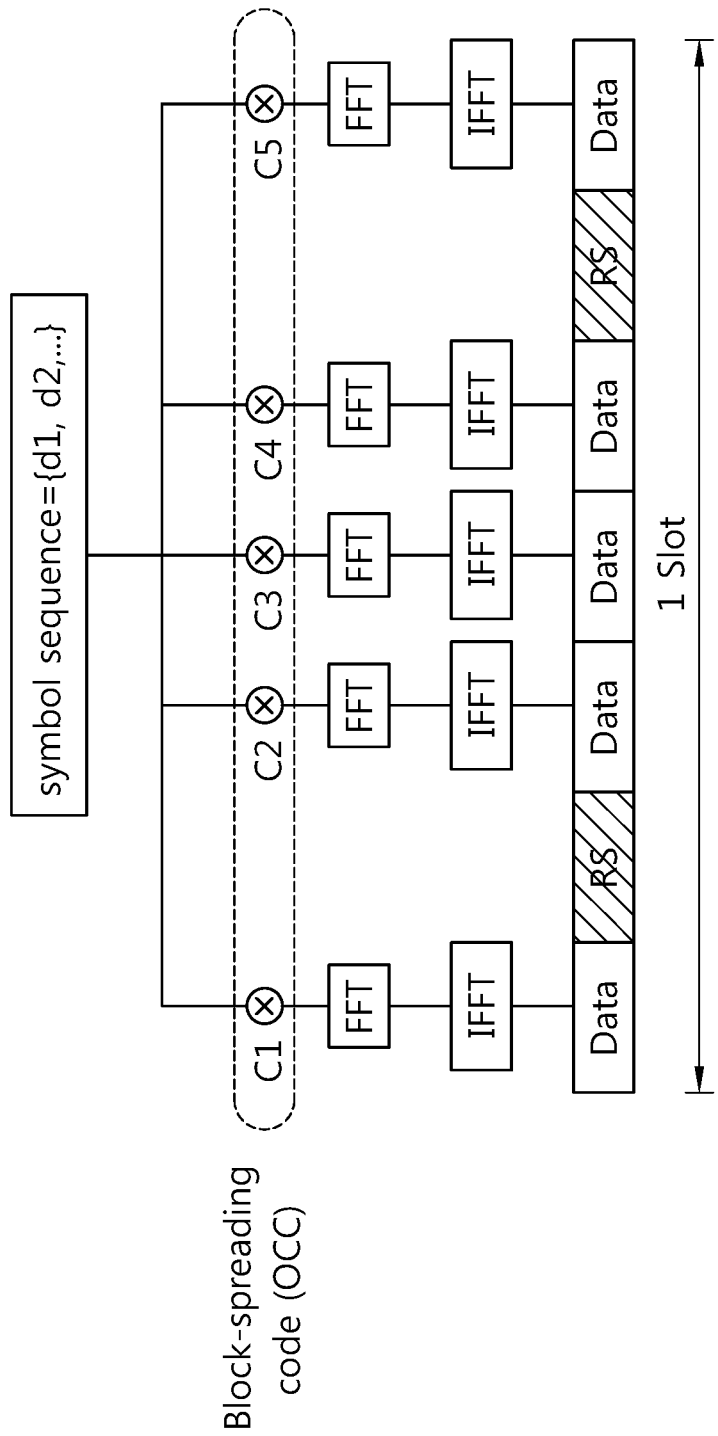
FIG. 7c illustrates the channel structure of PUCCH format 3.

FIG. 7c illustrates the channel structure of PUCCH format 3.

Referring to FIG. 7c, PUCCH format 3 is a PUCCH format using a block spreading technique. The block spreading technique means a method that spreads a symbol sequence in which multi-bit ACK/NACK is a time domain by using a block spreading code.

In the PUCCH format 3, the symbol sequence (e.g., an ACK/NACK symbol sequence) is spread and transmitted in the time domain by the block spreading code. An orthogonal cover code (OCC) may be used as the block spreading code. Control signals of multiple UEs may be multiplexed by the block spreading code. The PUCCH format 2 is different from the PUCCH format 3 in that in PUCCH format 2, symbols (e.g., d(0), d(1), d(2), d(3), d(4), etc., of FIG. 7b) transmitted in the respective data symbols are different from each other and UE multiplexing is performed by using the cyclic shift of a constant amplitude zero auto-correlation (CAZAC) sequence, while in the PUCCH format 3, the symbol sequence constituted by one or more symbols is transmitted throughout a frequency domain of each data symbol and spread in the time domain by the block spreading code to perform the UE multiplexing. In FIG. 7c, a case where 2 DMRS symbols are used in one slot is illustrated, but the present invention is not limited thereto and 3 DMRS symbols may be used and the orthogonal cover code having 4 as the spread factor may be used. The DMRS symbol may be generated from the CAZAC sequence having a specific cyclic shift and transmitted in a manner that a plurality of DMRS symbols of the time domain is multiplied by a specific orthogonal cover code.

<Uplink Reference Signal>

Hereinafter, an uplink reference signal will be described.

The reference signal is generally transported in sequence. As the sequence of the reference signal, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero auto-correlation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received sounding reference signal and uses the estimated uplink channel in the uplink scheduling. The SRS is not associated with transmission of the PUSCH or PUCCH. The same type of base sequence may be used for the DMRS and the SRS. Meanwhile, precoding applied to the DMRS in uplink multi-antenna transmission may be the same as precoding applied to the PUSCH. Cyclic shift separation is a primary scheme that multiplexes the DMRS. In the 3GPP LTE-A system, the SRS may not be precoded and further, may an antenna specific reference signal.

The reference signal sequence $r_{u,v}^{(\alpha)}(n)$ may be defined based on a base sequence $b_{u,v}(n)$ and a cyclic shift a by an equation given below.

$$r_{u,v}^{(\alpha)}(n)=e^{j\alpha n}b_{u,v}(n),\ 0\leq n\leq M_{sc}^{RS} \quad \text{[Equation 1]}$$

In Equation 1, $M_{sc}^{RS}=m^*N_{sc}^{RB}$ ($1\leq m\leq N_{RB}^{max,UL}$) represents the length of the reference signal sequence. $N_{sc}^{RB}$ represents the size of a resource block represented by the number of subcarriers in the frequency domain and $N_{RB}^{max,UL}$ represents a maximum value of an uplink bandwidth represented by the multiple of $N_{sc}^{RB}$. A plurality of reference signal sequences may be defined by differently applying a which is the cyclic shift value from one base sequence.

The base sequence $b_{u,v}(n)$ is divided into a plurality of groups and in this case, $u \in \{0, 1, \ldots, 29\}$ represents a group number and v represents a base sequence number in a group. The base sequence depends on the length ($M_{sc}^{RS}$) of the base sequence. Each group includes one base sequence (v=0) in which the length is $M_{sc}^{RS}$ with respect to m of $1\leq m\leq 5$ and includes two base sequences (v=0, 1) in which the length is $M_{sc}^{RS}$ with respect to m of $6\leq m\leq n_{RB}^{max,UL}$. A sequence group number u and a base sequence number v in the group may vary depending on a time like group hopping or sequence hopping.

When the length of the reference signal sequence is $3N_{sc}^{RB}$ or more, the base sequence may be defined by an equation given below.

$$b_{u,v}(n)=x_q(n \bmod N_{ZC}^{RS}),\ 0\leq n< M_{sc}^{RS} \quad \text{[Equation 2]}$$

In the above equation, q represents a root index of a Zadoff-Chu (ZC) sequence. $N_{ZC}^{RS}$ represent the length of the ZC sequence may be given as a prime number smaller than $M_{sc}^{RS}$. The ZC sequence having the root index of q may be defined by Equation 4.

$$x_q(m) = e^{-j\frac{\pi q m(m+1)}{N_{ZC}^{RS}}}, \ 0 \le m \le N_{ZC}^{RS} - 1 \quad \text{[Equation 3]}$$

In the above equation, q may be given by an equation given below.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \quad \text{[Equation 4]}$$

When the length of the reference signal sequence is $3N_{sc}^{RB}$ or less, the base sequence may be defined by an equation given below.

$$b_{u,v}(n) = e^{j\phi(n)\pi/4}, \ 0 \le n \le M_{sc}^{RS} - 1 \quad \text{[Equation 5]}$$

A table given below shows an example in which $\phi(n)$ is defined when $M_{sc}^{RS} = N_{sc}^{RB}$.

TABLE 3

| | $\phi(0), \ldots, \phi(11)$ | | | | | | | | | | |
|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |

TABLE 3-continued

| | $\phi(0), \ldots, \phi(11)$ | | | | | | | | | | |
|---|---|---|---|---|---|---|---|---|---|---|---|
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

A table given below shows an example in which $\phi(n)$ is defined when $M_{sc}^{RS} = 2 \cdot N_{sc}^{RB}$.

TABLE 4

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | 3 | 1 | −3 | −1 | 1 | −1 | 1 | −1 | −1 | 3 | 3 | −3 | −1 | 1 | −3 | |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Hopping of the reference signal may be applied as described below.

A sequence group number u of slot $n_s$ may be defined based on a group hopping pattern $f_{gh}(n_s)$ and a sequence shift pattern $f_{ss}$ by an equation given below.

$$u = (f_{gh}(n_s) + f_{ss}) \bmod 30 \quad \text{[Equation 6]}$$

17 different group hopping patterns and 30 different sequence shift patterns may exist. Group hopping may be applied or not applied by a group-hopping-enabled parameter which is a cell specific parameter provided by the higher layer. Further, the group hopping for the PUSCH may not be applied to specific UE by a disable-sequence-group-hopping parameter which is a UE specific parameter. The PUCCH and the PUSCH may have the same group hopping pattern and different sequence shift patterns.

The group hopping pattern $f_{gh}(n_s)$ is the same with respect to the PUSCH and the PUCCH and may be defined by an equation given below.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 7]}$$

In the above equation, c(i) as an imitation pseudo-random sequence which is a PN sequence may be defined by a gold sequence having a length of −31. An equation given below shows one example of the gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \quad \text{[Equation 8]}$$

Herein, Nc=1600, $x_1(i)$ represents a 1 m-th sequence, and $x_2(i)$ represents a 2 m-th sequence. The imitation pseudo-number sequence generator may be initialized to $$c_{init} = \left\lfloor \frac{N_{ID}^{cell}}{30} \right\rfloor$$

at the beginning of each radio frame.

Definition of the sequence shift pattern $f_{ss}$ may be different with respect to the PUCCH and the PUSCH. The sequence shift pattern of the PUCCH may be given as $f_{ss}^{PUCCH} = N_{ID}^{cell} \bmod 30$. The sequence shift pattern of the PUSCH may be given as $f_{ss}^{PUSCH} = (f_{ss}^{PUCCH} + \Delta_{ss}) \bmod 30$ and $\Delta_{ss} \in \{0, 1, \ldots, 29\}$ may be configured by the higher layer.

The sequence hopping may be applied only to a reference signal sequence having a length longer than $6N_{sc}^{RB}$. With respect to a reference signal sequence having a length shorter than $6N_{sc}^{RB}$, the base sequence number is given as v=0 in the base sequence group. With respect to the reference signal sequence having the length longer than $6N_{sc}^{RB}$, the base sequence number v in the base sequence group in slot $n_s$ may be defined by Equation 10.

$$v = \begin{cases} c(n_s) & \text{if group hopping is disabled and} \\ & \text{sequence hopping is enabled} \\ 0 & \text{otherwise} \end{cases} \quad \text{[Equation 9]}$$

c(i) may be expressed by an example of Equation 8 given above. The sequence hopping may be applied or not applied by a sequence-hopping-enabled parameter which is a cell specific parameter provided by the higher layer. Further, the sequence hopping for the PUSCH may not be applied to specific UE by the disable-sequence-group-hopping parameter which is the UE specific parameter. The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

A PUSCH DMRS sequence $r_{PUSCH}^{(\lambda)}(.)$ depending on a layer $\lambda(0, 1, \ldots, \gamma-1)$ may be defined by Equation 11.

$$r_{PUSCH}^{(\lambda)}(m \cdot M_{sc}^{RS} + n) = w^{(\lambda)}(m) r_{u,v}^{(\alpha_\lambda)}(n) \quad \text{[Equation 10]}$$

In the above equation, m=0, 1, ... and n=0, ..., $M_{sc}^{RS}-1$. $M_{sc}^{RS} = M_{sc}^{PUSCH}$. An orthogonal sequence $w^{(\lambda)}(m)$ may be determined according to a table to be described below.

In the slot $n_s$, the cyclic shift may be given as $\alpha = 2\pi n_{cs}/12$ and $n_{cs}$ may be defined by an equation given below.

$$n_{cs,\lambda} = (n_{DMRS}^{(1)} + n_{DMRS,\lambda}^{(2)} + n_{PN}(n_s)) \bmod 12 \quad \text{[Equation 11]}$$

In the above equation, $n_{DMRS}^{(1)}$ may be determined according to a cyclicShift parameter provided by the higher layer. A table given below shows an example of $n_{DMRS}^{(1)}$ determined according to the cyclicShift parameter.

TABLE 5

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to the above equation, $n_{DMRS,\lambda}^{(2)}$ may be determined by a DMRS cyclic shift field in DCI format 0 for the transport block depending on corresponding PUSCH transmission. A table given below shows an example of $n_{DMRS,\lambda}^{(2)}$ determined according to DMRS cyclic shift field.

TABLE 6

| DMRS cyclic shift field | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |

TABLE 6-continued

| DMRS cyclic shift field | $n^{(2)}_{DMRS,\lambda}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

$n_{PN}(n_s)$ may be defined by an equation given below.

$$n_{PN}(n_s) = \sum_{i=0}^{7} c(8 N_{symb}^{UL} \cdot n_s + i) \cdot 2^i \qquad \text{[Equation 12]}$$

c(i) may be expressed by the example of Equation 8 given above and applied for each cell of c(i). The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

The vector of the reference signal may be precoded by an equation given below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(v-1)} \end{bmatrix} \qquad \text{[Equation 13]}$$

In the above equation, P represents the number of antenna ports used for the PUSCH transmission. W represents a precoding matrix. With respect to the PUSCH transmission using the single antenna port, P=1, W=1, and υ=1. Further, with respect to spatial multiplexing, P=2 or 4.

With respect to each antenna port used for the PUSCH transmission, the DMRS sequence is multiplied by an amplitude scaling factor $\beta_{PUSCH}$ and sequentially mapped to the resource block. A set of physical resource blocks used for the mapping is the same as the set of physical resource blocks used for the PUSCH transmission. In the subframe, the DMRS sequence may be first mapped to the resource element in a direction in which the DMRS sequence increases in the frequency domain and thereafter, in a direction in which the slot number increases. The DMRS sequence may be mapped to a fourth SC-FDMA symbol (SC-FDMA symbol 3) in the case of the normal CP and a third SC-FDMA symbol (SC-FDMA symbol 2) in the case of the extension CP.

Figure 8A:
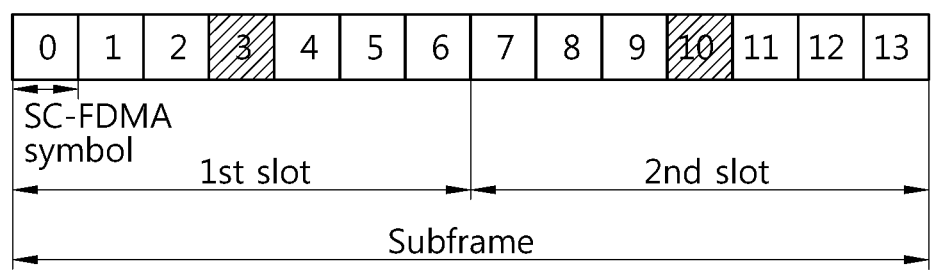
FIGS. 8a and 8b are one example of a subframe in which a DMRS for a PUSCH is transmitted.
Figure 8B:
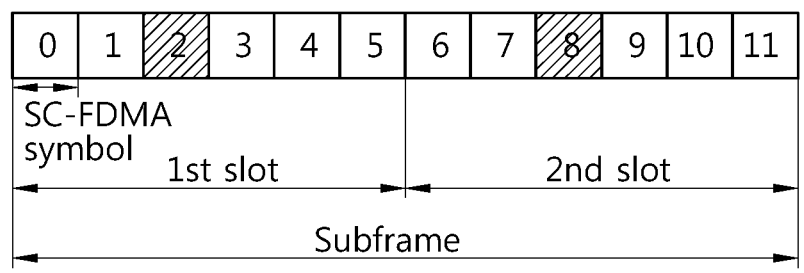

FIGS. 8a and 8b are one example of a subframe in which a DMRS for a PUSCH is transmitted.

The structure of the subframe in FIG. 8a shows a case of the normal CP. The subframe includes the first slot and the second slot. Each of the first slot and the second slot includes 7 SC-FDMA symbols. Symbol indexes of 0 to 13 are granted to 14 SC-FDMA symbols in the subframe. The reference signal may be transmitted through the SC-FDMA symbols having symbol indexes 3 and 10. The reference signal may be transmitted by using the sequence. The Zadoff-Chu (ZC) sequence may be used as the reference signal sequence and various ZC sequences may be generated according to a root index and a cyclic shift value. The base station allocates different cyclic shift values to the terminal to estimate channels of a plurality of terminals through an orthogonal sequence or quasi-orthogonal sequence. Locations of the frequency domains occupied by the reference signal in may be the same as each other or different from each other in two slots in the subframe. In two slots, the same reference signal sequence is used. Data may be transmitted through the residual SC-FDMA symbols other than the SC-FDMA symbol in which the reference signal is transmitted.

The structure of the subframe in FIG. 8b shows a case of the extension CP. The subframe includes the first slot and the second slot. Each of the first slot and the second slot includes 6 SC-FDMA symbols. Symbol indexes of 0 to 11 are granted to 12 SC-FDMA symbols in the subframe. The reference signal is transmitted through the SC-FDMA symbols having symbol indexes 2 and 8. The data is transmitted through the residual SC-FDMA symbols other than the SC-FDMA symbol in which the reference signal is transmitted.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<Machine Type Communication (MTC)>

Meanwhile, hereinafter, the MTC will be described.

Figure 9A:
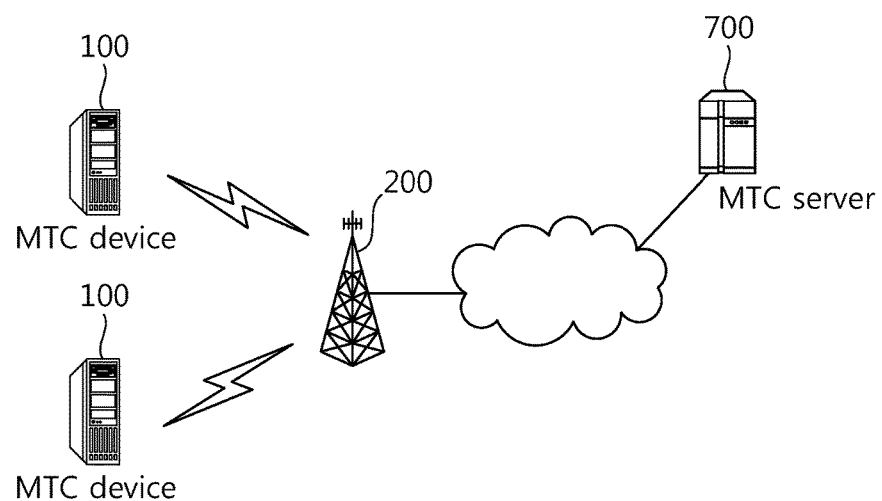
FIG. 9a illustrates one example of machine type communication (MTC).

FIG. 9a illustrates one example of machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 9B:
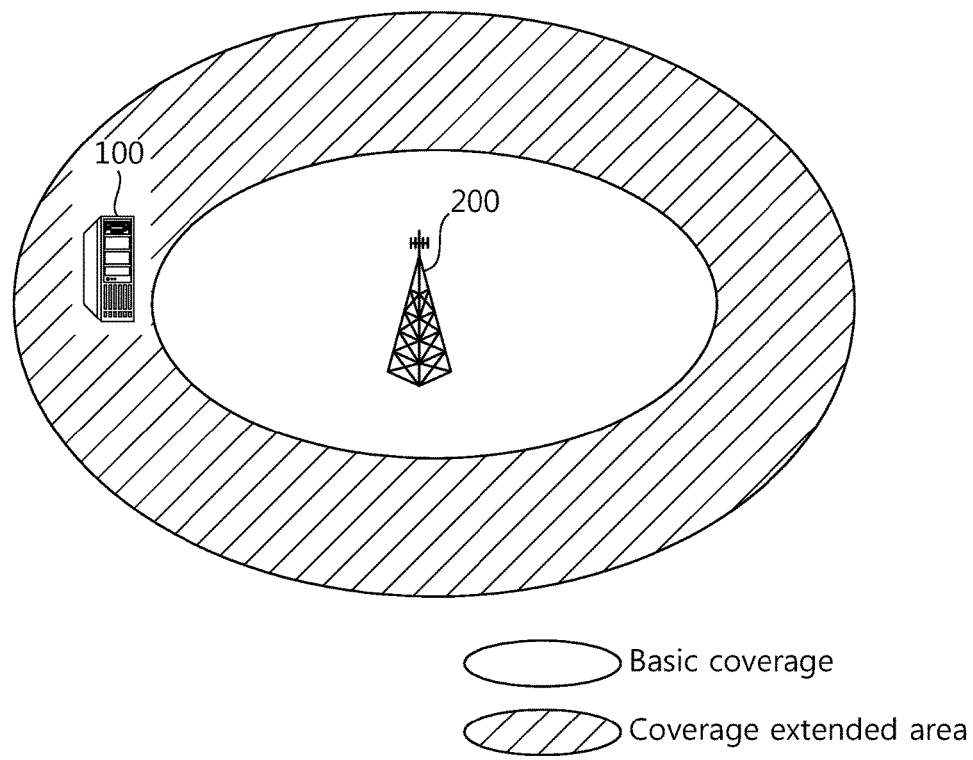
FIG. 9b is an example of cell coverage extension for an MTC device.

FIG. 9b is an example of cell coverage extension for an MTC device.

In recent years, it is considered that cell coverage extension or coverage enhancement (CE) of the base station extends for the MTC device 100 and various techniques for the cell coverage extension are discussed.

However, in the case where the coverage of the cell extends, when the MTC device positioned in the coverage extension are transmits an uplink channel, the base station undergoes a difficulty in receiving the uplink channel.

Figure 9C:
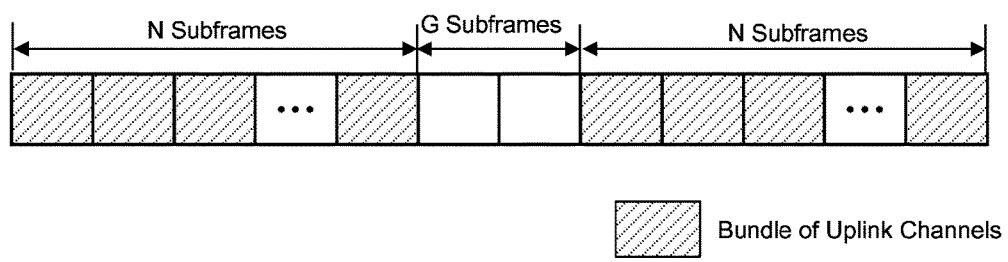
FIG. 9c is an exemplary diagram illustrating an example of transmitting a bundle of uplink channels.

FIG. 9c is an exemplary diagram illustrating an example of transmitting a bundle of uplink channels.

As known with reference to FIG. 9c, the MTC device positioned in the coverage extension area repeatedly transmits the uplink channel (for example, the PUCCH and/or PUSCH) on multiple subframes (for example, N subframes). As described above, the uplink channels which are repeated on the multiple subframes are called a bundle of the uplink channels.

Meanwhile, the base station receives the bundle of the uplink channels on the multiple subframes and decodes a part or the entirety of the bundle to increase decoding success rate.

Meanwhile, the base station may also transmit the bundle of the downlink channels (for example, the PDCCH and/or PDSCH) to the MTC device positioned in the coverage extension area on the multiple subframes similarly.

Figure 10A:
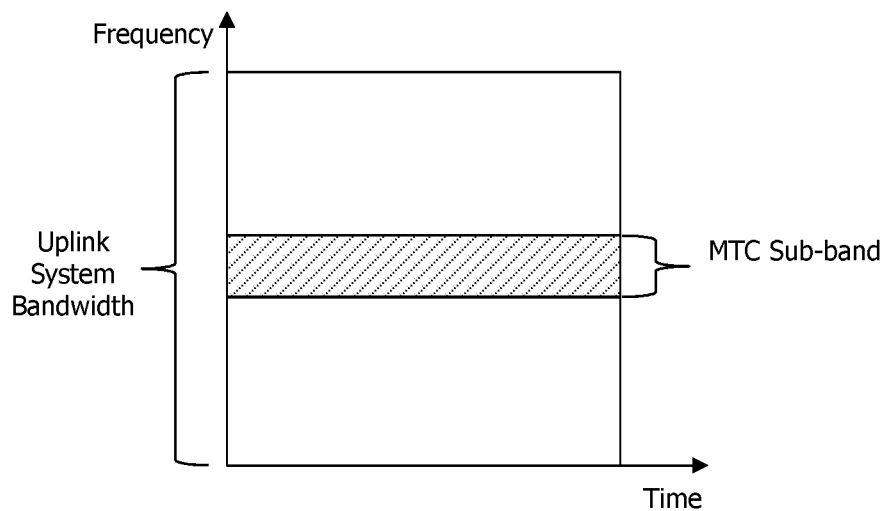
FIGS. 10a and 10b are exemplary diagrams illustrating not the entirety of an uplink system band but a partial subband of the MTC device.
Figure 10B:
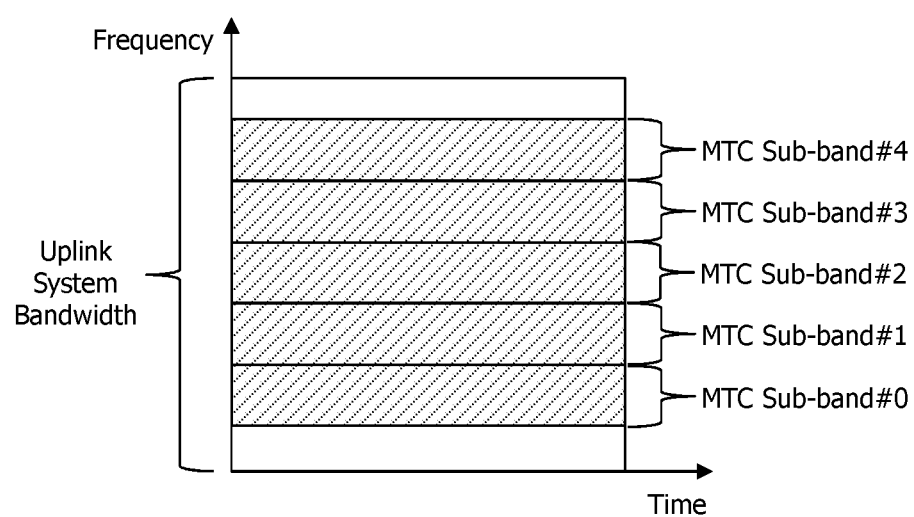

FIGS. 10a and 10b are exemplary diagrams illustrating not the entirety of an uplink system band but a partial subband of the MTC device.

As one method for low cost of the MTC device, the MTC device may use a subband at, for example, approximately 1.4 MHz regardless of an uplink system bandwidth of the cell as illustrated in FIG. 10a.

In this case, an area of the subband in which the MTC device operates may be positioned at a central area (for example, 6 central PRBs) of the uplink system bandwidth of the cell as illustrated in FIG. 9a.

Alternatively, as illustrated in FIG. 10b, multiple subbands of the MTC device are provided in one subframe for multiplexing of the MTC devices in the subframe, and as a result, the MTC devices may have different subbands. In this case, a majority of MTC devices may have other subbands other than the central area (for example, 6 central PRBs) of the system band of the cell.

On the other hand, when the amount of traffic transmitted by the MTC device is small, the MTC device may transmit the uplink data by using a resource in a band smaller than the subband illustrated in FIGS. 10a and 10b, for example, a band (frequency area) having a size equal to or smaller than one RB. Hereinafter, it will be described with reference to FIG. 10.

Figure 11A:
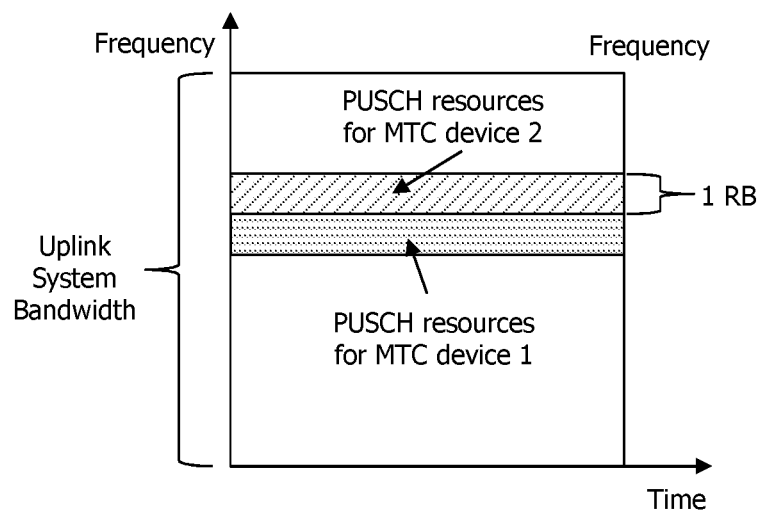
FIG. 11a illustrates an example in which the MTC device transmits the PUSCH on one RB and FIG. 11b illustrates an example in which the MTC device transmits the PUSCH on ½ RBs.
Figure 11B:
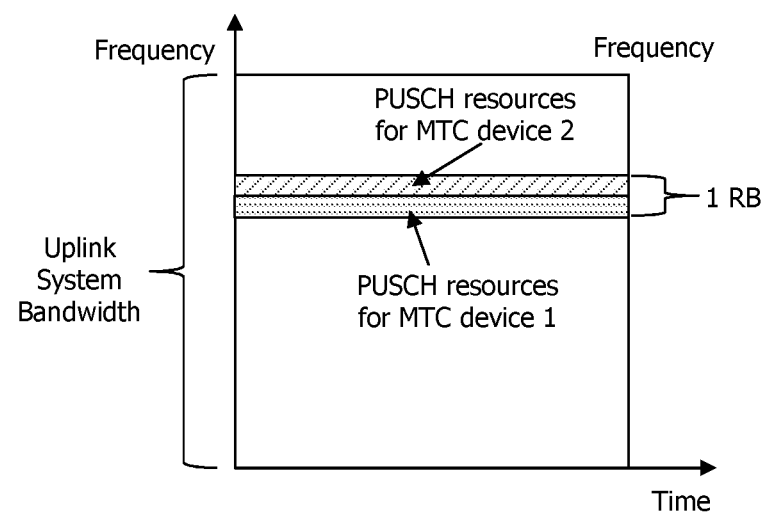

FIG. 11a illustrates an example in which the MTC device transmits the PUSCH on one RB and FIG. 11b illustrates an example in which the MTC device transmits the PUSCH on ½ RBs.

As known with reference to FIG. 11a, one RB may be allocated to each of MTC device 1 and MTC device 2 for the PUSCH. Therefore, each of the MTC device 1 and the MTC device 2 may transmit the PUSCH on one RB.

Further, as known with reference to FIG. 11b, one RB may be dividedly allocated to the MTC device 1 and the MTC device 2. Therefore, each of the MTC device 1 and the MTC device 2 may transmit the PUSCH by using the resource on the band (frequency domain) having the ½ RB size. As a result, multiple MTC devices may transmit the PUSCH on one PRB, and as a result, an advantage may occur in terms of multiplexing.

The PUSCH is transmitted on one RB size or the band (the resource of the frequency domain) smaller than one RB size by using transmission power to transmit the PUSCH on multiple RBs in the related art as it is to transmit the PUSCH by using a smaller quantity of resources while reducing transmission performance of the PUSCH.

However, in the related art, there is no method that allows the resource of the PUSCH which the base station allocates to the MTC device to be equal to or less than one RB size.

Moreover, in order for the base station to correctly demodulate the PUSCH or PUSCH which the UE transmits in the related art, a minimum unit of the frequency domain is RB similarly even in the demodulation reference signal (DMRS) transmitted by the UE in the related art.

<Disclosure of Present Specification>

Therefore, the disclosure of the present specification has been made in an effort to present a method that solves the problem.

In detail, the present specification presents a method that allocates the resource of the frequency domain having one RB size or less to the MTC device and a DMRS transmitting method in order for the MTC device to transmit the PUSCH/PUCCH by using the frequency resource having one RB size or less in an environment in which the amount of uplink traffic transmitted by the MTC device is small.

Contents of the present invention, which are described below may be applied even to transmission of the downlink channel (e.g., PDSCH and (E)PDCCH).

Hereinafter, in the present specification, the contents of the present invention are described based on the MTC device or the MTC device requiring the coverage extension will be described, but the contents/spirit of the present invention may be applied to another UE.

I. Method for Allocating Sub-PRB Resource for PUSCH/PUCCH

First, according to the disclosure of the present specification, the minimum unit of the frequency resource which may be used for transmitting the PUCCH/PUSCH as the PRB or sub-PRB may be as follows.

0.5 PRB (6 subcarriers)

1 subcarrier 2, 3, or 4 subcarriers

I-1. Resource Allocation for PUSCH

Hereinafter, in order for the MTC device to transmit the PUSCH by using the frequency resource (sub-PRB resource) having one RB size or less, a method in which the base station announces a transmission resource area of the PUSCH to the MTCI device will be described.

(1) First Method: Indication 1 Through DCI (Uplink Grant)

The base station adds a field constituted by new explicit bits to the DCI (uplink grant) transmitted through the PDCCH in order to announce the transmission resource position of the PUSCH to the MTC device, and as a result, the base station may announce the resource position in the PRB which the MTC device will transmit the PUSCH through the bits in the field.

In this case, the MTC device may present the position of 1 PRB resource including the resource area in which the MTC device transmits the PUSCH in the existing resource allocation field (that is, "Resource block assignment and hopping resource allocation" field) and announce through which frequency resource area in the corresponding PRB the MTC device will transmit the PUSCH through the bits of the newly added field into the DCI.

For example, when the minimum unit of the frequency resource for allocating the PUSCH is 0.5 PRBs (6 subcarriers), the base station may announce which resource area among 'subcarriers #0 to #5' and 'subcarriers #6 to #11' the MTC device will transmit the PUSCH by using through the bits of the newly added field. Alternatively, when the minimum unit of the frequency resource for allocating the PUSCH is 1 subcarrier, the base station may announce which resource area among 'subcarriers #0 to #11' and 'subcarriers #6 to #11' the MTC device will transmit the PUSCH by using through the bits of the newly added field.

(2) Second Method: Indication 2 Through DCI (Uplink Grant)

According to the second method, the existing resource allocation field (that is, "Resource block assignment and hopping resource allocation" field) included in the DCI (uplink grant) in the PDCCH which the base station transmits to announce the transmission resource position of the PUSCH to the MTC device may be improved to announce the PUSCH transmission resource based on the minimum unit.

For example, the uplink system bandwidth is reduced to 6 PRBs and when the minimum unit of the frequency resource for allocating the PUSCH is 0.5 PRBs (6 subcarriers), the 6 PRBs may be divided into 12 frequency resource areas per a total of 0.5 PRBs. Therefore, the resource allocation field in the existing DCI may indicate by which resource areas among 12 frequency resource areas the MTC device needs to transmit the PUSCH.

For example, when the minimum unit of the frequency resource for transmitting the PUSCH is 1 subcarrier, the PUSCH may be transmitted through a total of 72 subcarrier resource areas from a minimum of 1 subcarrier to a maximum of 6×12=72 subcarriers. The resource allocation field in the existing DCI field may be improved to indicate by which resource areas among 72 frequency resource areas the MTC device needs to transmit the PUSCH.

(3) Third Method: Indication 3 Through DCI (Uplink Grant)

When the MTC device is configured to use not a whole bandwidth but a partial subband of the uplink system, for example, only 6 PRBs and further, the MTC device is configured to transmit the PUSCH in 1 PRB or the frequency domain smaller than the 1 PRB size, it may be inefficient to perform the frequency hopping with respect to the PUSCH. Therefore, a frequency hopping flag field included in the existing DCI (uplink grant) may not be used.

Therefore, the third method proposes that the frequency hopping flag field in the DCI is improved to announce the resource position in the PRB to which the PUSCH will be transmitted.

In this case, the resource allocation field (that is, "Resource block assignment and hopping resource allocation" field) in the existing DCI may announce the position of 1 PRB resource including the resource area in which the MTC device transmits the PUSCH and the frequency hopping flag field in the DCI may announce through which frequency resource area in the corresponding PRB the MTC device will transmit the PUSCH.

For example, when the minimum unit of the frequency resource for allocating the PUSCH is 0.5 PRBs (6 subcarriers), 1 bit in the frequency hopping flag field may indicate through which resource area among 'subcarriers #0 to #5' and 'subcarriers #6 to #11' the MTC device will transmit the PUSCH.

(4) Fourth Method: Deciding Resource Using ID of MTC Device

According to the fourth method, the PUSCH transmission resource position of the PUSCH in the PRB may be decided according to the ID of the MTC device. For example, when the resource allocation field (that is, "Resource block assignment and hopping resource allocation" field) in the existing DCI field announces the position of the PRB resource, the MTC device may decide through which frequency resource area in the corresponding PRB to transmit the PUSCH based on the ID of the MTC device.

For example, the minimum unit of the frequency resource for transmitting the PUSCH is 0.5 PRBs (6 subcarriers), the MTC device in which MTC device ID mod 2=0 may transmit the PUSCH by using the area of 'subcarriers #0 to #5) and the MTC device in which MTC device ID mod 2=1 may transmit the PUSCH by using the resource area 'subcarriers #6 to #11'.

As another example, when the minimum unit of the frequency resource for transmitting the PUSCH is 1 subcarrier, an index of the subcarrier for transmitting the PUSCH in the PRB may be determined like the MTC device ID mod 12.

In more general, in a situation in which N subcarriers are included in one PRB, when the minimum unit of the frequency resource for transmitting the PUSCH is M subcarriers, the index of the subcarrier for transmitting the PUSCH in the PRB may be expressed as (UE ID mod (N/M))*M, (UE ID mod (N/M))*M+1, . . . , (UE ID mod (N/M))*M+M−1.

Alternatively, in a situation in which the number of subcarrier of an uplink cell in which the PUSCH may be transmitted is a total of N subcarriers, in the case where the minimum unit of the frequency resource for transmitting the PUSCH is M subcarriers, the index the subcarrier for transmitting the PUSCH in N corresponding subcarriers may be expressed as (UE ID mod (N/M))*M, (UE ID mod (N/M))*M+1, . . . , (UE ID mod (N/M))*M+M−1.

I-2. Indication of Resource Position for PUCCH

In this section, when the PUCCH is transmitted by using the frequency resource (sub-PRB resource) of an area smaller than one PRB, a method that announces the corresponding PUSCCH transmission resource area to the MTC device.

First Method Deciding Resource Using ID of MTC Device

The PUCCH transmission resource position in the PRB may be decided according to the ID of the MTC device. In detail, the MTC device may decide the position of the PRB resource that will transmit the PUCCH in each slot by the same method as in the existing method and thereafter, decide the PUSCH transmission resource position in the PRB.

In this case, according to the existing PUCCH transmission resource deciding method, the position of the PRB including the resource in which the MTC device transmits the PUCCH may vary depending on the slot. However, the present section proposes that the frequency resource position used by the MTC device in the PRB including the resource transmitting the PUCCH is maintained to be similar for each slot. Alternatively, the present section proposes that the frequency resource position used by the MTC device in the PRB including the resource transmitting the PUCCH is inverted based on the center of a frequency axis in two slots in the subframe. This is described below with reference to drawings.

Figure 12A:
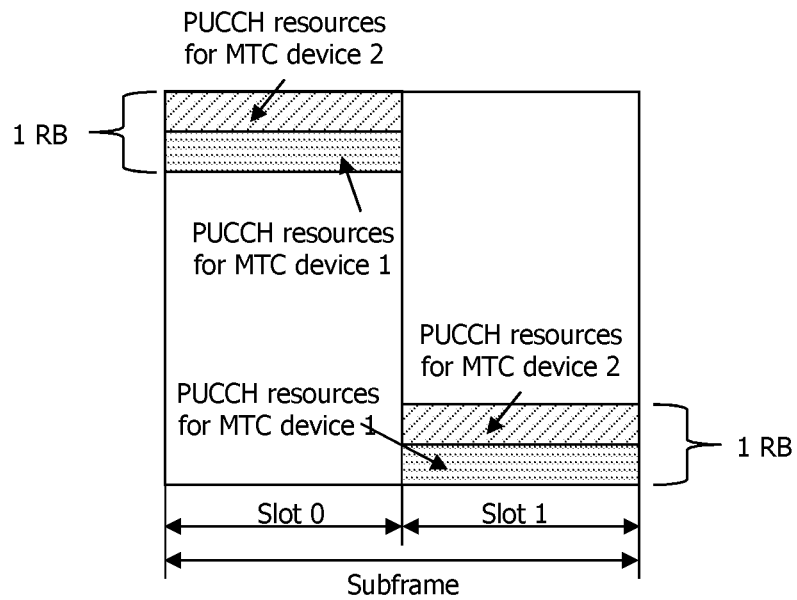
FIGS. 12a and 12b are exemplary diagrams illustrating a resource position of a PUCCH according to the present invention.
Figure 12B:
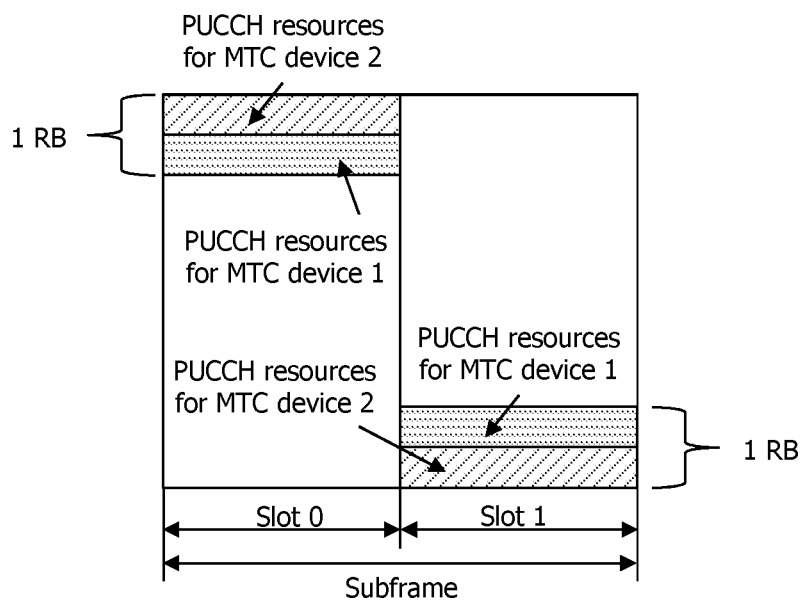

FIGS. 12a and 12b are exemplary diagrams illustrating a resource position of a PUCCH according to the present invention.

As illustrated in FIG. 12a, the frequency resource position used by each MTC device in the PRB including the resource transmitting the PUCCH is maintained to be similar for each slot.

For example, the minimum unit of the frequency resource for transmitting the PUSCH is 0.5 PRBs (6 subcarriers), the MTC device in which MTC device ID mod 2=0 may transmit the PUCCH by using the area of 'subcarriers #0 to #5) in the PRB resource and the MTC device in which MTC device ID mod 2=1 may transmit the PUCCH by using the resource area 'subcarriers #6 to #11'.

As another example, when the minimum unit of the frequency resource for transmitting the PUCCH is 1 subcarrier, an index of the subcarrier for transmitting the PUCCH in the PRB may be determined like the MTC device ID mod 12.

Alternatively, as illustrated in FIG. 12b, the frequency resource position used by the MTC device in the PRB including the resource that transmits the PUCCH may be inverted to each other in two slots based on the center of the frequency axis. For example, the minimum unit of the frequency resource for transmitting the PUSCH is 0.5 PRBs (6 subcarriers), the MTC device in which MTC device ID mod 2=0 may transmit the PUCCH by using the area of 'subcarriers #0 to #5) in the PRB resource and the MTC device in which MTC device ID mod 2=1 may transmit the PUCCH by using the resource area 'subcarriers #6 to #11', in slots having even indexes. However, the MTC device in which MTC device ID mod 2=0 may transmit the PUCCH by using the area of 'subcarriers #0 to #5) in the PRB resource and the MTC device in which MTC device ID mod 2=1 may transmit the PUCCH by using the resource area 'subcarriers #6 to #11', in slots having odd indexes.

As another example, when the minimum unit of the frequency resource for transmitting the PUCCH is 1 subcarrier, the index of the subcarrier for transmitting the PUCCH in the PRB may be determined like the MTC device ID mod 12 in the slots having the even indexes and determined like 11—(UE ID mod 12) in the slots having the odd indexes.

In more general, in a situation in which N subcarriers are included in one PRB, when the minimum unit of the frequency resource for transmitting the PUCCH is M subcarriers, the index of the subcarrier for transmitting the PUCCH in the PRB may be expressed as (UE ID mod (N/M))*M, (UE ID mod (N/M))*M+1, . . . , (UE ID mod (N/M))*M+M−1.

Alternatively, in a situation in which the number of subcarrier of an uplink cell in which the PUCCH may be transmitted is a total of N subcarriers, in the case where the minimum unit of the frequency resource for transmitting the PUCCH is M subcarriers, the index the subcarrier for transmitting the PUCCH in N corresponding subcarriers may be expressed as (UE ID mod (N/M))*M, (UE ID mod (N/M))*M+1, . . . , (UE ID mod (N/M))*M+M−1.

II. DMRS for PUSCH/PUCCH

The present section proposes a transmission technique of the DMRS transmitted together with the PUSCH/PUCCH when the MTC device transmits the PUSCH/PUCCH by using the frequency resource (sub-PRB resource) having one RB size or less.

II-1. Transmitting DRMS Through Only Frequency Resource Area in which PUSCH/PUCCH is Transmitted When the MTC device transmits the PUSCH/PUCCH through only a partial frequency resource area in the PRB, the DMRS transmitted together with the PUSCH/PUCCH may also be transmitted through only a partial frequency resource area in the PRB. The sequence of the DMRS used in this case may be determined as below.

(1) First Method: Proposing New DMRS Sequence

The existing DMRS sequence is defined based on the frequency area resource (12 subcarriers) of a minimum of 1 PRB. In the case of the DMRS for one PRB, 30 sequences generated to be orthogonal to each other are defined and the MTC device generates/transmits the DMRS by using one of the 30 sequences. In this case, the length of one sequence is equal to 12 which is the number of subcarriers.

Therefore, when the PUSCH/PUCCH is transmitted through only a partial frequency resource area in the PRB, the sequence for the DMRS having the length corresponding to the number of corresponding subcarriers is required. In this case, the DMRS sequence having the length corresponding to the number of subcarriers in the PRB in which the PUSCH/PUCCH may be transmitted may be newly designed/defined and used.

(2) Second Method: Puncturing Existing DMRS Sequence

The MTC device maps the DMRS sequence for one PRB area to the PRB including the frequency resource area transmitting the PUSCH/PUCCH and thereafter, punctures the DMRS with respect to the resource area other than the frequency resource area in which the PUSCH/PUCCH is transmitted to transmit the DMRS to the frequency resource area in which the PUSCH/PUCCH is transmitted.

For example, when the PUSCH may be transmitted only with respect to subcarriers #6 to #11 in a specific PRB, the DMRS is mapped to the whole subcarrier area of the corresponding PRB and thereafter, the DMRS may be punctured with respect to subcarriers #0 to #5 areas and the DMRS may be transmitted only to subcarriers #6 to #11 areas. In this case, when the DMRS sequence in one corresponding PRB is expressed as r0, r1, . . . , r11, only r6, r7, . . . , r11 may be transmitted through subcarriers #6 to #11 resources.

(3) Third Method: Rate-Matching Existing DMRS Sequence

For transmitting the DMRS for only a partial frequency resource area in the PRB, the sequence for one PRB (that is, 12 subcarriers) are generated and thereafter, only a length required in a leading part (alternatively, a trailing part) of the sequence may be used as the DMRS sequence.

For example, when the PUSCH may be transmitted only with respect to subcarriers #6 to #11 in a specific PRB, the sequence corresponding to 12 subcarriers of the corresponding PRB may be generated and thereafter, the DMRS may be transmitted through subcarriers #6 to #11 by using only 6 values of the leading part (alternatively, the trailing part). When the DMRS is generated by using the leading part of the sequence, when the DMRS sequence in one corresponding PRB is expressed as r0, r1, . . . , r11, only r0, r1, . . . , r5 may be transmitted through subcarriers #6 to #11 resources.

II-2. Transmitting DRMS Through PRB Area Including Frequency Resource Area in which PUSCH/PUCCH is Transmitted When the MTC device transmits the DMRS having a length as large as the number of subcarriers used for transmitting the PUSCH/PUCCH, the length of the DMRS sequence is too short, and as a result, it may be difficult to guarantee inter-cell or inter-MTC device orthogonality of the DMRS.

Therefore, in order to prevent the difficulty, when the PUSCH/PUCCH of the MTC device is transmitted through only a partial frequency resource area in the PRB, the DMRS transmitted together with the PUSCH/PUCCH may be transmitted through the whole PRB area (12 subcarriers) even though the PUSCH/PUCCH is transmitted through only a partial frequency resource area in the PRB. In this case, the MTC devices that transmit the PUSCH/PUCCH in the same PRB resource are configured to use sequences orthogonal to each other, and as a result, the base station may distinguish the DMRS of each MTC device. That is, the PUSCH/PUCCH which the MTC device transmits in the PRB may be transmitted through different frequency resource areas by an FDM method, but the DMRS of the corresponding PUSCH/PUCCH may be transmitted in the same frequency resource area, but distinguished by CDM.

According to the related art, when the MTC device transmits the DMRS in one PRB resource, the base sequence used for generating the DMRS sequence on the specific subframe is determined as one.

The MTC device may generate a final DMRS sequence by using the corresponding base sequence and the final DMRS sequence is decided according to values of $n^{(1)}_{DMRS}$ and $n^{(1)}_{DMRS}$. In this case, the values of the corresponding $n^{(1)}_{DMRS}$ and $n^{(1)}_{DMRS}$ are decided by a value of a 'Cyclic shift for DM RS and OCC index' field having a 3-bit length included in the DCI (uplink grant).

Therefore, although the DMRS is generated by using the same base sequence, different 8 types of DMRS sequences may be generated according to the value of the 'Cyclic shift for DM RS and OCC index' field having the 3-bit length in the DCI.

As a result, the PUSCH which the MTC device transmits in the PRB is subjected to the FDM to be transmitted through different frequency resource areas, but when the DMRS of the corresponding PUSCH/PUCCH is transmitted in the same frequency resource area, the sequences of the DMRSs transmitted between the MTC devices may be configured to be different from each other by using methods given below so that the DMRSs are distinguished from each other by the CDM.

(1) First Method: Indication Through DCI

The base station may set the value of the 'Cyclic shift for DM RS and OCC index' field to be different from each other with respect to multiple MTC devices that are subjected to the FDM in the same PRB area to transmit the PUSCH. In this case, since the length of the 'Cyclic shift for DM RS and OCC index' field is 3 bits, a maximum of 8 MTC devices may be multiplexed in one PRB resource. When the PUSCHs for more MTC devices are intended to be multiplexed in one PRB, the length of the 'Cyclic shift for DM RS and OCC index' field of the DCI (uplink grant) for the MTC device may be extended to, for example, 4 bits.

(2) Second Method: ID (UE ID) of MTC Device

The base station may make the DMRS sequences transmitted by the multiple MTC devices that are subjected to the FDM to transmit the PUSCH/PUCCH in the same PRB area be different from each other according to the IDC of the MTC device.

To this end, for example, 1) a cyclic shift value used when generating the DMRS may be configured to be decided by the ID of the MTC device or 2) the base sequence for generating the DMRS itself may be configured/decided to be different from each other according to the ID of the MTC device.

(3) Third Method: Making DMRS Sequences be Different from Each Other According to Position of PUSCH Resource (Subcarrier) in PRB The base station may make the DMRS sequences transmitted by the multiple MTC devices that are subjected to the FDM to transmit the PUSCH/PUCCH in the same PRB area be different from each other according to the position of the resource that transmits the PUSCH/PUCCH in the PRB area. In more detail, the DMRS sequence may be configured to be decided according to a smallest (largest) index value among indexes of subcarriers (alternatively, a bundle of the subcarriers) in which the MTC device transmits the PUSCH/PUCCH in the PRB area.

In this case, for example, when the minimum unit of the resource transmitting the PUSCH/PUCCH is two subcarriers, 2 subcarriers are bundled among 12 subcarriers in one PRB, and as a result, a total of 6 bundles of the subcarriers may be generated. In this case, the DMRS sequence may be differently generated according to the smallest (alternatively, largest) index in the bundle of the subcarriers in which the PUSCH/PUCCH is transmitted. In more detail, when the MTC device 1 transmits the PUSCH through the bundle of subcarriers #0 and #1 and the MTC device 2 transmits the PUSCH through the bundle of subcarriers #4 to #6, the MTC device 1 may generate the DMRS sequence by a value of '0' which is the smallest index in the bundle of the subcarriers in which the PUSCH is transmitted and the MTC device 2 may generate the DMRS sequence by a value of '4' which is the smallest index in the bundle of the subcarriers in which the PUSCH is transmitted.

To this end, for example, 1) the cyclic shift value used when generating the DMRS may be configured to be decided according to the smallest (largest) index value in the subcarriers (alternatively, the bundle of the subcarriers) in which the MTC device transmits the PUSCH/PUCCH in the PRB area or 2) the base sequence for generating the DMRS itself may be configured to be decided differently from each other according to the smallest (largest) index value in the subcarriers (alternatively, the bundle of the subcarriers) in which the MTC device transmits the PUSCH/PUCCH in the PRB area.

In order to multiplex more MTC devices while enabling various PUSCH/PUCCH transmission resource areas to be used, the above proposed technique in which 'the PUSCHs transmitted by the MTC devices in the PRB are subjected to the FDM to be transmitted through different frequency resource areas, but the DMRSs of the corresponding PUSCHs are subjected to CDM with each other to be transmitted through the same frequency resource area' may be considered to be extended to PUSCH/PUCCH transmission and DMRS transmission. That is, the DMRS is continuously with a constant PRB size, but the PUSCH/PUCCH may be transmitted with various frequency area sizes in the PRB area in which the corresponding DRMS is transmitted.

That is, the minimum unit of the frequency area resource for transmitting the PUSCH/PUCCH and the minimum unit of the frequency area resource for transmitting the DMRS may be configured to be different from each other. In this case, the resource size for transmitting the DMRS may be continuously determined per specific PRB and the corresponding value may be defined in advance or configured by SIB, RRC, DCI, etc., by the base station. For example, the transmission resource size of the DMRS may be continuously determined as two PRBs of the PUSCH. In this case, the PUSCH/PUCCH may be transmitted only through the frequency area size which is equal to or smaller than the DMRS transmission resource size. In this case, the PUSCHs/PUCCHs transmitted between different MTC devices are transmitted through FDM with each other in the PRB area in which the DMRS is transmitted, but the DMRS in the same PRB may be transmitted by the CDM method by using different sequences.

Figure 13:
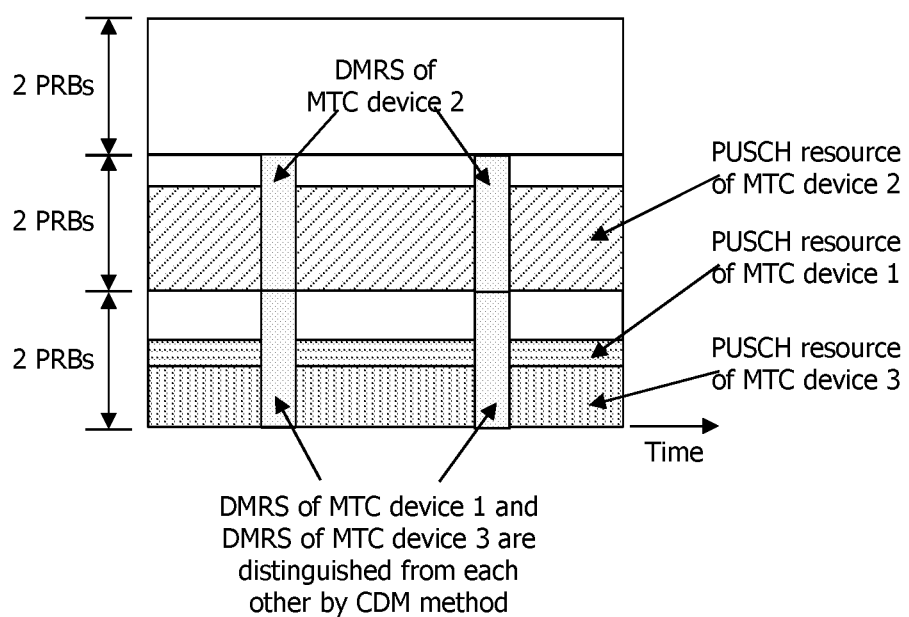
FIG. 13 illustrates an example in which a transmission position of the DMRS is decided depending on the resource position of the PUSCH/PUCCH.

FIG. 13 illustrates an example in which a transmission position of the DMRS is decided depending on the resource position of the PUSCH/PUCCH.

As may be known with reference to FIG. 13, when the transmission resource size of the DMRS is, for example, two PRBs, the transmission area of the PUSCH/PUCCH is determined in the transmission resource size of the DMRS and the MTC device may transmit the DMRS on two PRBs including the transmission resource of the PUSCH/PUCCH. In this case, the transmission position of the DMRS may be decided according to the resource position of the PUSCH/PUCCH transmitted by each MTC device.

Figure 14:
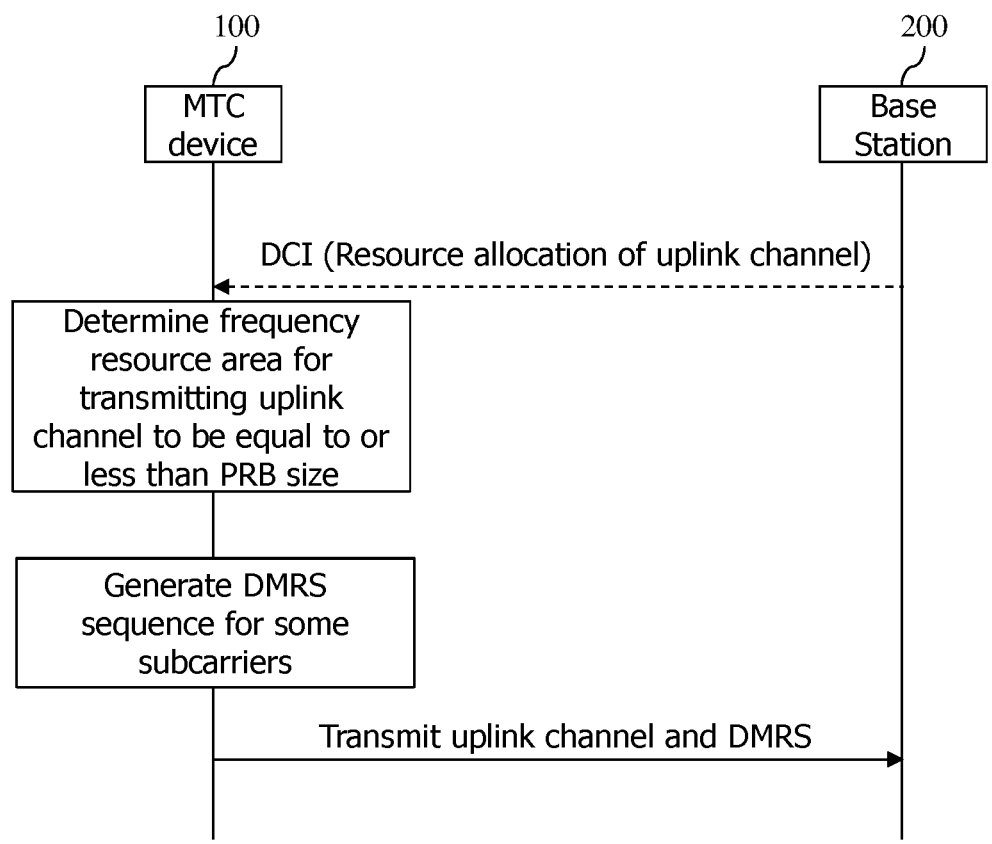
FIG. 14 is a flowchart schematically organizing and illustrating disclosures of the present specification.

FIG. 14 is a flowchart schematically organizing and illustrating disclosures of the present specification.

Referring to FIG. 14, the MTC device decides the frequency resource area to transmit the uplink channel to be equal to or less than the PRB size including 12 subcarriers.

As such, when the frequency resource area to transmit the uplink channel is decided to be smaller than the PRB size including 12 subcarriers, the MTC device generates the DMRS sequences for some subcarriers among 12 subcarriers.

Subsequently, the MTC device transmits the uplink channel and the DMRS in some subcarriers in the PRB.

The DMRS sequence may be generated as already described above. For example, the MTC device may first generate the DMRS sequence having the length of 12, map the DMRS having the length of 12 to 12 subcarriers and thereafter, puncture the DMRS sequence mapped onto the residual subcarriers other than the some subcarriers. As another example, the MTC device may generate the DMRS sequence having the length of 12 and thereafter, map subcarriers of the number of some subcarriers among the DMRS sequences having the length of 12 to the some subcarriers.

Meanwhile, a base station 200 may transmit the DCI including resource allocation of the uplink channel to the MTC device.

In this case, when the resource allocation field in the DCI indicates the frequency resource area that will transmit the uplink channel as the specific PRB, the DCI may further include a field indicating the some subcarriers in the specific PRB.

Alternatively, the resource allocation field in the DCI may indicate the some subcarriers.

When the resource allocation field in the DCI indicates the frequency resource area that will transmit the uplink channel as the specific PRB, the hopping flag field in the DCI may indicate the some subcarriers.

Meanwhile, the MTC device may decide the some subcarriers in the PRB based on the ID thereof.

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 15:
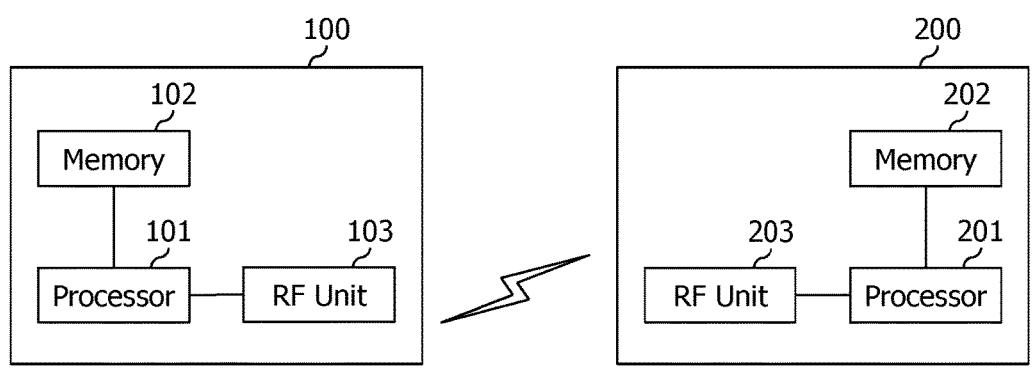
FIG. 15 is a block diagram illustrating a wireless communication system in which the disclosure of the present invention is implemented.

FIG. 15 is a block diagram illustrating a wireless communication system in which the disclosure of the present invention is implemented.

A base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

An MTC device 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting an uplink (UL) data channel and a demodulation reference signal (DMRS), the method performed by a machine type communication (MTC) device and comprising:
   receiving downlink control information (DCI);
   determining a frequency resource area for transmitting the UL data channel based on the received DCI, a size of the determined frequency resource area less than a size of a physical resource block (PRB) including 12 subcarriers;
   generating the DMRS having a size less than the size of the PRB based on the size of the determined frequency resource area; and
   transmitting the UL data channel and the DMRS on less than the 12 subcarriers based on the determined frequency resource area,
   wherein the DCI includes a frequency hopping flag field related to the less than the 12 subcarriers onto which the frequency resource area is mapped in the PRB.

2. The method of claim 1, wherein generating the DMRS comprises:
   generating an original DMRS sequence having a size of 12 subcarriers;
   mapping the generated original DMRS sequence to the PRB; and
   puncturing the generated original DMRS sequence mapped onto subcarriers other than the less than the 12 subcarriers.

3. The method of claim 1, wherein generating the DMRS comprises:
   generating an original DMRS sequence having a size of 12 subcarriers; and
   mapping the DMRS among the generated original DMRS sequence, a size of the mapped DMRS equal to a size of the determined frequency resource area.

4. The method of claim 1, further comprising selecting one of a plurality of DMRS sequences based on a smallest index among indexes for the less than the 12 subcarriers.

5. A machine type communication (MTC) device for transmitting an uplink (UL) data channel and a demodulation reference signal (DMRS), the MTC device comprising:
   a transceiver configured to transmit and receive signals; and
   a processor operatively connected to the transceiver and configured to:
   control the transceiver to receive downlink control information (DCI);
   determine a frequency resource area for transmitting the UL data channel based on the received DCI, a size of the determined frequency resource area less than a size of a physical resource block (PRB) including 12 subcarriers;
   generate the DMRS having a size less than the size of the PRB based on the size of the determined frequency resource area; and
   control the transceiver to transmit the UL data channel and the DMRS on less than the 12 subcarriers based on the determined frequency resource area,
   wherein the DCI includes a frequency hopping flag field related to the less than the 12 subcarriers onto which the frequency resource area is mapped in the PRB.

6. The MTC device of claim 5, wherein generating the DMRS comprises:
   generating an original DMRS sequence having a size of 12 subcarriers;
   mapping the generated original DMRS sequence to the PRB; and
   puncturing the generated original DMRS sequence mapped onto subcarriers other than the less than the 12 subcarriers.

7. The MTC device of claim 5, wherein generating the DMRS comprises:
   generating an original DMRS sequence having a size of 12 subcarriers; and
   mapping the DMRS among the generated original DMRS sequence, a size of the mapped DMRS equal to a size of the determined frequency resource area.

8. The MTC device of claim 5, wherein the processor is further configured to select one of a plurality of DMRS sequences based on a smallest index among indexes for the less than the 12 subcarriers.

* * * * *